(12) United States Patent
Solis (10) Patent No.: US 10,893,649 B2
(45) Date of Patent: Jan. 19, 2021

(54) BRACING AND BLOCKING APPARATUS FOR A VARIETY OF USES

(71) Applicant: George Patrick Solis, Houston, TX (US)

(72) Inventor: George Patrick Solis, Houston, TX (US)

(*) Notice: Subject to any disclaimer, the term of this patent is extended or adjusted under 35 U.S.C. 154(b) by 360 days.

(21) Appl. No.: 16/048,784

(22) Filed: Jul. 30, 2018

(65) Prior Publication Data
US 2020/0029509 A1 Jan. 30, 2020

(51) Int. Cl.
*A01G 13/02* (2006.01)
*A01G 9/28* (2018.01)
*E04H 17/16* (2006.01)

(52) U.S. Cl.
CPC .............. *A01G 9/28* (2018.02); *E04H 17/168* (2013.01)

(58) Field of Classification Search
CPC ..... E04H 17/16; E04H 17/161; E04H 17/163; E04H 17/063; E04H 17/14; A01G 13/0237; A01G 13/0281; A01G 9/28; A01G 13/00; A01G 13/0268; E02D 31/002; E02D 17/20; E02B 3/124
USPC ..................................................... 405/15, 32
See application file for complete search history.

(56) References Cited

U.S. PATENT DOCUMENTS

| | | | | |
|---|---|---|---|---|
| 1,888,364 A | * | 11/1932 | Van Orman | E02B 3/124 405/32 |
| 3,426,536 A | * | 2/1969 | Heinrich | E02B 3/04 405/32 |
| 4,279,535 A | * | 7/1981 | Gagliardi | E02D 17/202 405/15 |
| 5,628,495 A | * | 5/1997 | Gandara | E04H 17/165 256/24 |
| 5,658,096 A | * | 8/1997 | Von Kanel | E02D 29/0241 405/302.4 |
| 6,108,972 A | * | 8/2000 | Solis | A01G 9/28 47/65.6 |
| 6,189,263 B1 | | 2/2001 | Solis | |
| 6,230,439 B1 | | 5/2001 | Solis | |
| 6,270,286 B1 | | 8/2001 | Solis | |
| 6,843,616 B2 | * | 1/2005 | Sychra | E01F 7/02 210/170.03 |
| 6,855,650 B1 | * | 2/2005 | Bohannon, Jr. | B29B 17/0042 264/911 |
| 6,877,721 B2 | * | 4/2005 | Calverley | E01F 8/0017 256/24 |
| 7,172,372 B2 | * | 2/2007 | McGinn | E02B 3/043 405/15 |
| 7,708,503 B2 | * | 5/2010 | Kohel | E02D 17/20 405/302.7 |
| 7,736,097 B2 | * | 6/2010 | D'Andreta | B32B 5/18 405/302.6 |

(Continued)

*Primary Examiner* — Monica L Barlow
(74) *Attorney, Agent, or Firm* — Egbert, McDaniel & Swartz, PLLC (57) ABSTRACT

A panel assembly has a first panel formed of a wire grid and a second panel formed of a wire grid. The second panel is mechanically affixed to a side of the first panel. Each of the wire grids includes a first grid member, a second grid member, and a barrier layer interposed between the first and second grid members. A connector joins a side of the second panel to a side of the first panel. The barrier layer can be of a permeable or impermeable material. An edge protector can be applied over an edge of the first and second grid members.

15 Claims, 3 Drawing Sheets

(56) References Cited

U.S. PATENT DOCUMENTS

| | | | | |
|---|---|---|---|---|
| 7,820,560 | B2* | 10/2010 | Weiser | B32B 5/028 442/32 |
| 8,689,501 | B2* | 4/2014 | Chamoux | E02D 29/0208 52/173.1 |
| 2006/0233611 | A1* | 10/2006 | Li | A01G 13/0256 405/15 |
| 2007/0269275 | A1* | 11/2007 | Kimberlin | E02D 17/20 405/302.6 |
| 2008/0247830 | A1* | 10/2008 | Heselden | E02D 29/0216 405/273 |
| 2010/0172701 | A1* | 7/2010 | Tucker | E02D 29/02 405/284 |
| 2010/0224847 | A1* | 9/2010 | Rowley | E04H 17/16 256/24 |
| 2014/0054528 | A1* | 2/2014 | Boggs | E04H 17/16 256/24 |
| 2016/0258183 | A1* | 9/2016 | Masserant | E01F 13/028 |
| 2019/0344148 | A1* | 11/2019 | Miller | A63B 71/022 |

* cited by examiner

BRACING AND BLOCKING APPARATUS FOR A VARIETY OF USES

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to an apparatus for bracing and blocking applications. More particularly, the present invention relates to a grid-shaped apparatus having a flexible structure. Additionally, and more particularly, the present invention relates to an apparatus for bracing soil; retaining water, gas, and oil; for blocking roots; and for supporting structures in construction and oil and gas. The present invention also relates to a soil bracing and root blocking configuration. The present invention further relates to products and processes bracing soil, sand, water, oil, liquid gas, and other chemicals while blocking plant roots, tree roots and weeds. The present invention also relates to soil bracing and root blocking apparatus for use in landscaping, construction, and oil and gas industries.

2. Description of Related Art Including Information Disclosed Under 37 CFR 1.97 and 37 CFR 1.98

Panels have been provided in the past for the purpose of bracing soil, retaining water and for blocking roots. Commonly available braces suffer from a variety of deficiencies. The previous commercially available solid braces do not allow water to easily escape out of the bed resulting in unhealthy plants, bogging soil and plant root rot. In some instances, the added weight of the retained water can threaten the soil brace. It is noted that conventional soil bracing products are typically available in four to six inch widths that do not offer elevated bed support. It is also noted that conventional products, such as steel edging or thick plastic edging can be heavy, very hard or impossible to bend, and very difficult to adapt to a particular geometric arrangement, as required. It is also noted that many of the conventional bracing products, such as steel edging, require special expensive metal cutters for onsite fabrication. It is also noted that conventionally available steel edging is generally heavy and expensive to ship.

In the past, the present inventor has developed several patented products that effectively brace soil, retain water and block roots. For example, U.S. Pat. No. 6,108,972 issued on Aug. 29, 2000 to the present inventor, describes a device for retaining garden beds, retaining water, and/or blocking plant roots. The device has a pair of connected reinforcing members with a liquid permeable member positioned between the reinforcing members. This patent also describes a method of building a garden bed including the device around the perimeter of the bed. This patent also describes a method for building a pond or stream which includes using the device around the perimeter of the pond or stream. The gardening apparatus includes a first reinforcing member, a second reinforcing member connected to the first reinforcing member wherein at least one of the reinforcing members is resistant to degradation, and a liquid permeable member positioned between the first and second reinforcing members.

U.S. Pat. No. 6,189,263, issued on Feb. 20, 2001 to the present inventor, provides a method for building a garden bed which includes the steps of positioning a retaining apparatus to form a garden bed perimeter defining the garden bed, anchoring a portion of the retaining apparatus with soil, and providing soil within the garden bed. The retaining apparatus has a first reinforcing member, a second reinforcing member connected to the first reinforcing member, and a liquid permeable member positioned between the first and second reinforcing members.

U.S. Pat. No. 6,230,439, issued on May 15, 2001 to the present inventor, further describes a method of blocking root travel from a first subterranean area to a second subterranean area. In this method, an excavation is formed between the first and second subterranean areas. A retaining member is positioned in the excavation. The retaining member includes a first reinforcing member, a second reinforcing member connected to the first reinforcing member wherein at least one of the first and second reinforcing members is resistant to degradation, and a liquid permeable member positioned between the first and second reinforcing members. The retaining member is buried in soil.

U.S. Pat. No. 6,270,286, issued on Aug. 7, 2001 to the present inventor, describes a method of building a water retaining member. This method includes the steps of forming an excavation, positioning a retaining apparatus around the perimeter of the excavation, positioning a liner in the excavation and over the retaining apparatus, anchoring a portion of the retaining apparatus with soil and providing water within the excavation. The retaining apparatus includes a first reinforcing member, a second reinforcing member connected to the first reinforcing member and a liquid permeable member positioned between the first and second reinforcing members.

It is an object of the present invention to provide a panel assembly which is long lasting, strong and durable.

It is another object of the present invention to provide a panel assembly that is capable of a variety of uses in a wide number of applications.

It is still another object of the present invention to provide a panel assembly which allows for the flow of water, nutrients and/or fertilizers in both directions across the panel assembly.

It is still another object of the present invention to provide a panel assembly that is easily adaptable to various widths, lengths, configurations, and geometries for adaptation to various uses.

It is still another object of the present invention to provide a panel assembly which is flexible so as to allow the user to adapt the panel assembly to curves as well as to straight lines without any special fittings that are required by some conventional products.

It is still another object of the present invention to provide a panel assembly which is easy to cut and install so as to reduce installation time.

It is a further object of the present invention to provide a panel assembly which does not require expensive metal cutters.

It is still a further object of the present invention to provide a panel assembly which is of a lighter weight so as to reduce shipping charges and reduce costs to the ultimate purchaser.

It is still another object of the present invention to provide a panel assembly which is less costly than current metal braces or structures.

It is still another object of the present invention to provide a panel assembly which is less obtrusive or noticeable when installed.

It is another object of the present invention to provide a panel assembly that allows for vertical construction uses, such as underground root block barrier edging, retaining wall edging, silt fences, retaining walls, bridge retaining walls, landfill containment and vertical expansion, and mineshaft edging.

It is another object of the present invention to provide a panel assembly that can be used for horizontal construction uses, such as underground root block barrier edging, foundation soil underlayment, road construction soil underlayment stabilization, railroad track underlayment stabilization, and erosion and sediment control.

It is still another object of the present invention to provide a panel assembly that is effective for vertical oil and gas uses, such as settling reserve pits, oil and fuel batteries, refinery underground construction edging for prevention and/or containment of oil and fuel leakage, underground service station fuel storage tank leakage containment, and oil spill edging for containment booms.

It is still a further object of the present invention to provide a panel assembly that can be used with horizontal oil and gas uses, such as drill site sub-grade reinforcement edging, haul road construction edging for soil underlayment stabilization, oilfield walkway and footpath edging for base and sub-grade stabilization.

It is another object of the present invention to provide a panel assembly that can be applied to garden and landscape uses, such as garden bed plant containment, garden bed root and weed barriers, garden retaining walls, terrace garden graduated retaining walls, and rooftop gardening.

It is another object of the present invention to provide a panel assembly that can be used for water gardening purposes, such as construction of natural looking streams, ponds, lakes, and waterfalls.

It is still another object of the present invention to provide a panel assembly that can be utilized by nurseries for ball plant cultivation in greenhouse containers, keeping plant roots separated from each other when used to grow seedlings, tree seedling root ball cultivation, and nursery walkways and footpaths.

It is still a further object of the present invention to provide a panel assembly that provides root block barriers associated with plant root, tree roots, and weed block edging, driveway, sidewalk, and patio block edging, drainage and plumbing pipe protection from root invasion, and residential and commercial found the foundation root block edging.

It is still another object of the present invention to provide a panel assembly that can be used in association with retaining walls for containing soil, sand, and rocks, for silt fences for erosion control, and for multiple product, stacked retaining wall systems for commercial, industrial and residential projects.

It is still a further object of the present invention to provide a panel assembly can be used in the fields of agriculture and farming, animal control, bridges, erosion and sediment control, flood control, foundation improvement and stabilization, highways and roads, landfills, mineshaft retaining walls, floors, nuclear waste disposal, railroads, reinforce slopes, retaining walls, road construction soil underlayment stabilization, root block barriers, solid waste containment, water filtration and gray water treatment, drilling sites, oil and fuel storage tanks, refineries, and oil spills.

These and other objects and advantages of the present invention will become apparent from a reading of the attached specification and appended claims.

BRIEF SUMMARY OF THE INVENTION

The present invention is a panel assembly that is adaptable to a wide variety of uses. In particular, the panel assembly of the present invention can be utilized in association with gardening, landscaping, water gardening, nursery, construction, including agriculture and farming, animal control, bridges, erosion and sediment control, flooding, foundation improvement and stabilization, highways and roads, landfills, mineshaft retaining walls, flooring and truck dump headwalls and loading ramps, nuclear waste disposal, removal and cleanup, railroads, reinforcing slopes, retaining walls, road construction soil underlayment stabilization, root block barriers, solid waste containment, water filtration, and oil and gas including its uses in drilling sites, refinery construction, oil storage and fuel storage leakage prevention, and oil spills. The present invention has both vertical construction and landscape uses and horizontal construction uses. In the field of horizontal construction uses, the present invention can be utilized for underground root block barrier edging, foundation soil underlayment, road construction soil underlayment stabilization, railroad track underlayment stabilization, and erosion and sediment control. The present invention can also be used horizontally in the field of oil and gas for metal drill site sub-grade reinforcement edging, haul road construction edging for soil underlayment stabilization, oilfield walkway and footpath edging for base and sub-grade stabilization. In the field of oil and gas, the vertical application of the present invention is effective in the field of settling reserve pit and pond construction edging, oil and fuel battery/storage tank leakage containment, refinery underground construction edging for preventing oil and fuel leakage, for underground service station fuel storage tank leakage containment, and for oil spill edging for containment booms. In this field, the panel assembly should be generally non-permeable.

The panel assembly of the present invention includes a first panel and a second panel. The second panel is affixed to a side of the first panel. In particular, the second panel is hingedly connected to the side of the first panel. The second panel can extend from the width edge or the length edge of the first panel. The second panel will have a configuration generally matching the configuration of the first panel. A connector joins the second panel to the first panel. In particular, this connector is a loop which extends around a wire of the grid of the first panel and around a wire of the grid of the second panel. A plurality of loops are positioned in spaced relationship to each other. Each loop is commonly known as a hog wire. The edges of each of the panels can be roll formed. Additionally, a single fold can hold the first and second panels together.

Each of the first and second panels includes a first grid member, a second grid member and a barrier which is interposed between the first and second grid members. The second grid member is securely affixed to the first grid member such that the barrier is strongly retained therebetween.

The first grid member includes a plurality of wires which extend parallel to each other and transverse to each other. A first plurality of wires extends lengthwise across the first grid member. A second plurality of wires extends widthwise across the first grid member. The first grid member will have a generally flat configuration. The first grid member is of a flexible configuration. The wires of the first grid member can be formed of a metal material, a polymeric material, or a polymer-coated metal.

The second grid member also includes a plurality of wires extending parallel and transverse to each other. The first plurality of wires of the second grid member extend lengthwise. A second plurality of wires of the second grid member extend widthwise. The second grid member is of a generally flexible flat configuration. The wires of the second grid member can be made of a metal material, a polymeric material, or a polymer-coated metal (such as vinyl-coated metal). The metal material can be made of any metal type but most generally it is made of galvanized metal or galvanized meal coated in vinyl or other polymeric material. This vinyl coating protects the metal as it resists chemical, fertilizers, insecticides, herbicides and fungicides.

The barrier is interposed between the first grid member and the second grid member. The barrier can be formed of a woven or non-woven material. The barrier can be formed of a permeable or non-permeable material. In particular, the barrier can be formed of a material such as polyester, polyamide, polypropylene, polyethylene, nylon, and rayon. The barrier can also include components that facilitate the use of such a barrier. The barrier should be able to withstand exposure to various chemicals that are utilized in the various applications.

There are several benefits provided by the double sided, mesh design enclosing a permeable or non-permeable material barrier. First, the first and second grid members protect the enclosed barrier between them from penetration, abrasion, tearing, and/or destruction from outside forces such as shovels, hoes, pipes, aggregates, rocks, stones, or any other objects. Secondly, the first and second grid members keep the barrier between them stationary thus avoiding harrier slippage or movement. This innovative soil erosion and sediment control technology prevents washouts under the silt fence which is one of the major problems with traditional silt installation. Thirdly, the first and second members provide maximum soil anchoring without the need for anchor stakes. Its unique mesh design allows it to adhere to and grab the surrounding soil and allows plant roots to grab it keeping it securely in place. It will remain symmetrically vertical in the ground without support stakes when properly installed and you get no frost heave.

An edge protector can be applied to an edge of either of the first and second panels. The edge protector can be formed of polymeric material, such as vinyl. Preferably, the edge protector will be applied over the top edge of each of the first and second panels. As such, the edge protector will distribute any force that is applied to the top edge of the panels across a wider area so as to avoid deformation of the panel assembly of the present invention. The edge protector has a generally U-shaped configuration. The edge protector will have a first portion extending over an outer side of the first grid member, a second surface extending over an outer side of the second grid member, and a central area which extends over the edges of the first and second grid members and over the edge of the barrier.

The present invention is also a method of forming a grid assembly. This method includes the steps of: (1) providing a roll of a first wire grid, a roll of a barrier material, and a roll of a second wire grid; (2) unwinding the roll such that the first wire grid overlies the barrier material in such that the barrier material overlies the second wire grid in a sandwiched configuration; and (3) applying a pressure to the sandwiched configuration such that the first wire grid, the second wire grid, and the barrier material are secured together.

The method of the present invention further includes cutting the secured sandwiched configuration of the layers into a desired size of a panel assembly. The first wire grid, second wire grid and the barrier material are passed between adjacent rollers. These rollers apply pressure so as to seal the first wire grid to the second wire grid with the barrier layer sandwiched therebetween. In particular, the step of applying pressure comprises bending outer edges of the first and second wire grids over each other by the adjacent rollers.

DETAILED DESCRIPTION OF THE INVENTION

Figure 1:
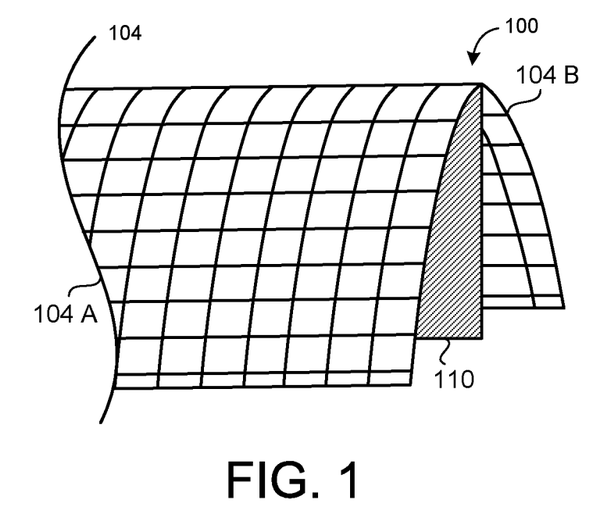
FIG. 1 is a perspective view and partially exploded view showing the assembly of a single panel of the present invention. A single fold can hold both sides of the present invention together.

Referring to FIG. 1, there is shown a single panel 100 of the panel assembly of the present invention. The panel 100 includes a barrier 110 and a reinforcement member 104. The reinforcement member 104 has a first grid member 104A and a second grid member 104B.

In the practice of the present invention, it should be understood that the barrier 110 may be any physical structure suitable for the intended purposes of the panel 100. For example, the barrier 100 can be formed of a permeable or impermeable material, depending on the desired application. For example, it is generally desired that the barrier 110 be suitable for preventing penetration by roots and/or vegetation, while still allowing water nutrients and fertilizers to pass through the barrier 110. Such a permeable structure is preferably woven or non-woven. In the practice of the present invention, any material, permeable or non-permeable, may be utilized as the material for barrier 110 provided that the selected material is suitable for withstanding long-term contact with the soil. If the barriers to be utilized in an agricultural or garden setting, the barrier should be suitable for withstanding exposure to the various chemicals that are utilized in agricultural or garden settings, such as herbicides, insecticides, fertilizers, plant foods, and the like. It is understood that while the barrier 110 may be comprised of a material that is inherently resistant to exposure to such soil and the various chemicals, lesser materials may be utilized if such a provided with a suitable coating a protective layer to protect against exposure to such soil or chemicals.

While any material meeting the requirements as specified above may be utilized as barrier 110, it is preferred in the practice of the present invention that barrier 110 be constructed from a polymeric material. Non-limiting examples of polymeric materials which are suitable for forming a woven barrier 110 of the present invention include polyester, polyamid, polypropylene, polyethylene, nylon, and rayon. The permeable or non-permeable barrier layer 100 can be made out of woven or non-woven polymeric material.

In some instances, it may be desired to provide barrier with certain selected chemicals, for example, herbicides, insecticides, fertilizers, plant foods, and the like, which diffuse into the soil over time. The barrier may also be provided with a water insoluble inorganic copper compound in an amount effective to stop root growth.

The reinforcement member 104 of the present invention, may be made of any suitable material that will provide the necessary reinforcement to barrier 110. Of course, the amount of reinforcement necessary will depend upon the inherent properties of barrier 110, and the application to which soil brace 100 is being applied.

As with barrier 110, reinforcement member 104 should comprise a material suitable to withstand long term exposure to soils and resist rotting, rusting and/or degradation. Where soil brace 100 is to be utilized in agricultural or garden settings, it should also be adequately resistant to exposure to chemicals which are normally found in such agricultural and garden settings, such as fertilizers, herbicides, insecticides, plant foods, and the like.

Reinforcement member 104 may be formed from a suitable metal, polymeric material, treated wood, composite material, or ceramic as desired. Preferably, reinforcement member 104 comprises metal or polymeric material. More preferably, reinforcement member 104 comprises galvanized wire or a durable plastic.

In the embodiment of panel 100 as shown in FIG. 1, reinforcement member 104 comprises a first grid member 104A and a second grid member 104B between which is sandwiched barrier 110. It should be noted that reinforcement member 104 may comprise to join together first grid member 104A and second grid member 104B as shown in FIG. 1, or it may comprise of two disjointed members first grid member 104A and second grid member 104B. The grid sizes of reinforcement member 104 is generally selected to provide a uniform reinforcing with grid openings in the range of about 1/16 inches to about 2 inches, preferably in the range of about 1/8 inches to about 1 inches, and even more preferably in the range of about 1/4 inches to about 1/2 inches.

While in the embodiment of panel 100 as shown the grid of reinforcement member is of a uniform rectangular shape, there is no requirement that the grid be so limited, as any other suitable grid shape may be utilized.

It should also be noted that while the embodiment of panel 100 is shown as having a first grid member 104A and a second grid member 104B between which is sandwiched barrier 110, it should be understood that any number of grid members and barriers may be utilized, with any desired arrangement of grid members and barriers utilized. As non-limiting examples, one or more barriers in the interior may be sandwiched between one or more grid members on the outside, or barrier layers may be interspersed between any number of grid members.

Methods of manufacturing such a reinforcement member 104 are well known in the art and any suitable method which would result in the reinforcement member 104 as described may be employed for the practice of the present invention.

Barrier 110 and reinforcement member 104 are assembled by any suitable technique to form panel 100. The most simple assembly technique would include sandwiching barrier 110 between reinforcement member 104 and suitably interlocking the edges of one-half of reinforcement member 104 with the other half of reinforcement member 104, for example by twisting or otherwise interlocking the edges together. Another suitable technique would include sandwiching barrier 110 between reinforcement members 104A and 104B, and affixing barrier 110 to reinforcement member 104, for example through the use of roll forming the panel edges, stapling, stitching, fusing, threading, anchoring, gluing, or adhering.

The practice of the present invention, reinforcement member 104 and barrier 110 may be assembled into panel 100 by any suitable technique known to those skilled in the art, including, but not limited to chemical, thermal, or mechanical (including sonic and needle punch techniques) bonding methods wherein the panel 100 formed thereby allows for the ready penetration of water but prevents penetration of plants and roots through panel 100. Barrier 110 can also be of a non-water-permeable fabric. Other assembly methods include glue, adhesive tape, stitching, sewing, having, hogwire, and folding.

Panel 100 of the present invention is believed to be long lasting, strong, and durable. The more preferred embodiment of panel 100 comprising either galvanized wire mesh or durable plastic mesh will resist rotting, rusting or other degradation.

The barrier 110 and reinforcement member 104 allow for flow of water therethrough. Panel 100 will allow the flow of water, nutrients and fertilizers into and out of any garden beds made therefrom. Therefore, the added weight of water in the garden bed will not cause undue pressure against panel 100 used to make such bed, and as water can escape out of the bed there is better soil drainage producing healthier plants and less root suffocation, and/or rot.

Panel 100 may be made to any suitable standard commercial length, thickness and width of the barrier and reinforcement members. The materials of construction for both reinforcement member 104 and barrier 110 are also generally selected so that panel 100 may be easily cut by the end use gardener, construction worker, or oil and gas worker utilizing conventional tools without the need to utilize special expensive metal cutters. The materials of construction are also selected to allow for easy cutting to decrease installation time. The materials of construction for panel 100 are also preferably selected to provide a panel 100 which is flexible and bendable thereby allowing the end use landscaper to adapt the panel 100 to curvilinear as well as straight lines without requiring any special fittings as are required by some conventional products.

According to the present invention the materials with construction for soil brace 100 are also preferably selected to provide a panel 100 which is generally light weight to provide for ease of handling during installation, and to provide for reductions in shipping costs. Preferably, the materials of construction for panel 100 and its method of assembly are selected to provide a product that is relatively affordable to the end use landscaper, construction worker, and oil and gas worker.

The colors for panel 100 are generally selected to provide for a soil brace which is generally not to obtrusive or noticeable thereby producing a natural garden appearance. Non-limiting examples of suitable colors include most shades of green, most shades of brown, and black. Preferably panel 100 is substantially the color of the soil which it is bracing.

Figure 2:
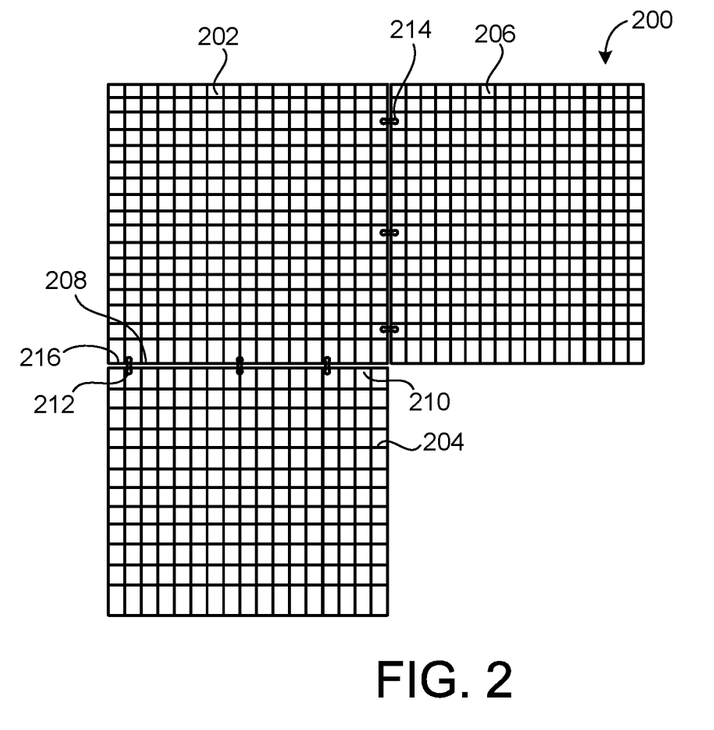
FIG. 2 is a frontal view showing the joining of several panels to each other in an assembly.

Referring to FIG. 2, there is shown the panel assembly 200 in accordance with the teachings of the present invention. The panel assembly 200 can include a first panel 202, a second panel 204 and a third panel 206. Each of the panels 202, 204 and 206 has a relatively similar configuration. As can be seen, the second panel 204 is hingedly connected to the bottom edge 206 of the first panel 202. In particular, the first panel 202 has a wire 208 located at the bottom edge thereof. The second panel 204 has a wire 210 located at the upper edge thereof. Loop members 212 will extend around the bottom wire 208 and the top wire 210 so as to hingedly connect the second panel 204 to the bottom of the first panel 202. These loops 212 can be in the nature of hog wires. These hog wires are easily applied over the respective wires of the first panel 202 and the second panel 204. As a result of this configuration, the second panel 204 can move into any desired orientation with respect to the first panel 202. Each of the panels 202 and 204 will have the configuration similar to that described in association with FIG. 1 herein.

The third panel 206 has a side edge which is joined hingedly to a side edge of the first panel 202. As can be seen, loops 214 will extend around the side wire of the first panel 202 and around the side wire of the second panel 204 so as to establish a similar flexible and hingeable relationship in the manner of first panel 202 and second panel 204.

Another concept of the present invention a wide variety and number of panels can be joined in the manner described in association with FIG. 2 to the first panel 202. As such, a desired length of such panel assembly 200 can be established, as desired in a quick and convenient manner. Also, a desired depth of the panel assembly 200 can be achieved. The ability to hingedly connect one panel to another panel allows the ability to adapt the panel assembly construction of FIG. 1 to a wide variety of uses beyond that of gardens and landscaping. Any desired array can be achieved through this technique. In addition, any number of wires of the first panel 202 can be hinged together to any number of wires of the second panel 204 or to any number of wires of the third panel 206.

Figure 3:
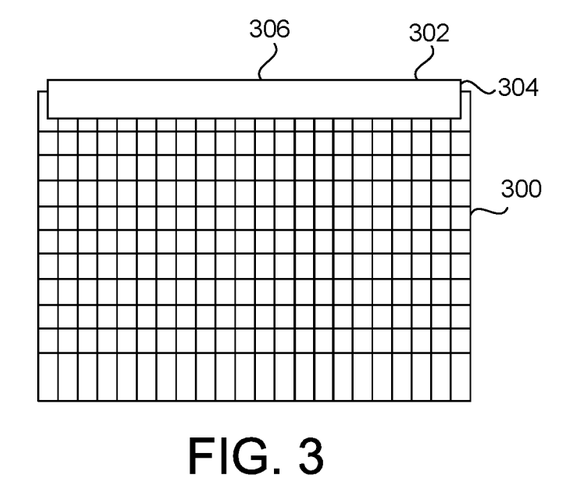
FIG. 3 is a frontal view showing the application of the edge protector over the top of a panel.

FIG. 3 illustrates a panel 300 having an edge protector 302 positioned over the top edge 304 of the panel 300. The edge protector 302 extends substantially for the length of the panel 300. The edge protector 302 is illustrated as having a surface 306 which extends downwardly beyond the top edge 304 of the panel 300. Similarly, an opposite side of the edge protector 302 will extend downwardly over the opposite side of the panel 300. The edge protector 302 can be formed of a suitable rigid polymeric material or any other suitable material. As such, the edge protector 302 can be suitably applied over the top edge 304 of the panel 300 so as to avoid any deformation of the panel 300 should a force be applied to the top of the panel 300. The edge protector 302 will further add rigidity to the structure of the panel 300, as desired. The edge protector 302 can be easily snap fit or otherwise applied over the top edge 304 of the panel 300. The edge protector 302 can be easily applied over the top edges of the panel. This avoids injury should someone fall onto the edging or step on the edging.

Figure 4:
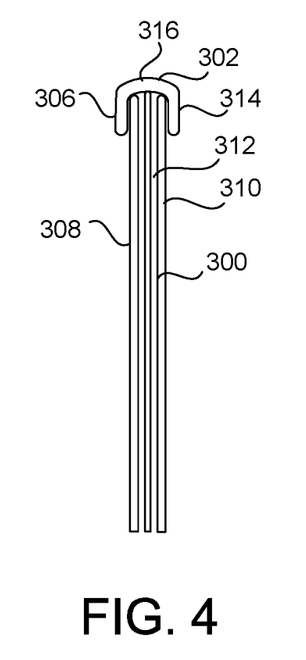
FIG. 4 is an end view showing the configuration of the edge protector as applied over the top edge of the panel.

FIG. 4 illustrates the application of the edge protector 302 over the top edge 304 of the panel 300. It can be seen that the panel 300 includes a first grid member 308, a second grid member 310 and a barrier 312 positioned between the first grid member 308 and the second grid member 310.

The edge protector 302 has a generally inverted U-shaped configuration. The edge protector 302 has side 306 which extends downwardly so as to be positioned over the outer side of the first grid member 308. The edge protector 302 has another side 314 which extends downwardly so as to reside over the outer surface of the second grid member 310. The edge protector 302 has an intermediate portion 316 which will overlie the top edge 304 of the grid members 308 and 310 and over the top of the barrier 312. The edge protector 302 provides substantial protection against any deformation that can be applied to the panel 300 when a downward force is applied to the top edge 304.

The panel assembly 200 of the present invention can have a wide variety of applications. This wide variety of applications is achieved by the ability to join the separate panels to each other in a desired array. As such, extended lengths of such panel assemblies or extended widths of such panel assemblies become possible.

Figure 5:
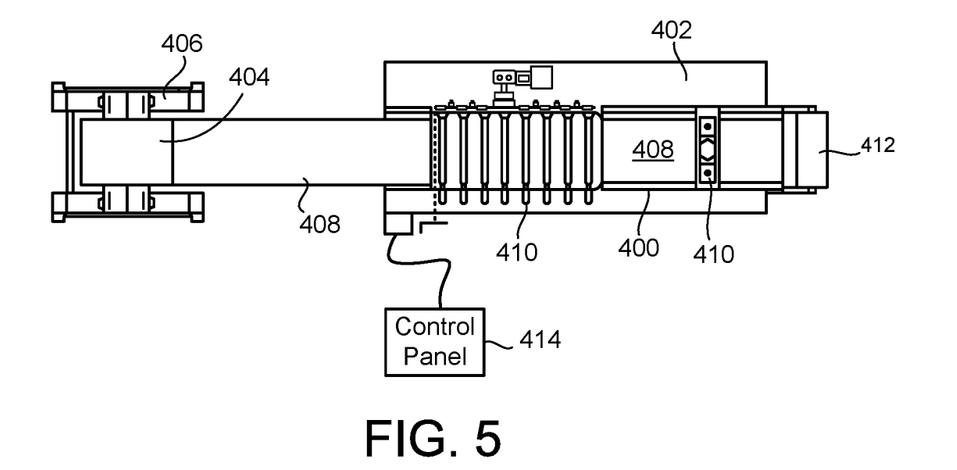
FIG. 5 is a plan view of the process for forming the panel assembly of the present invention.
Figure 6:
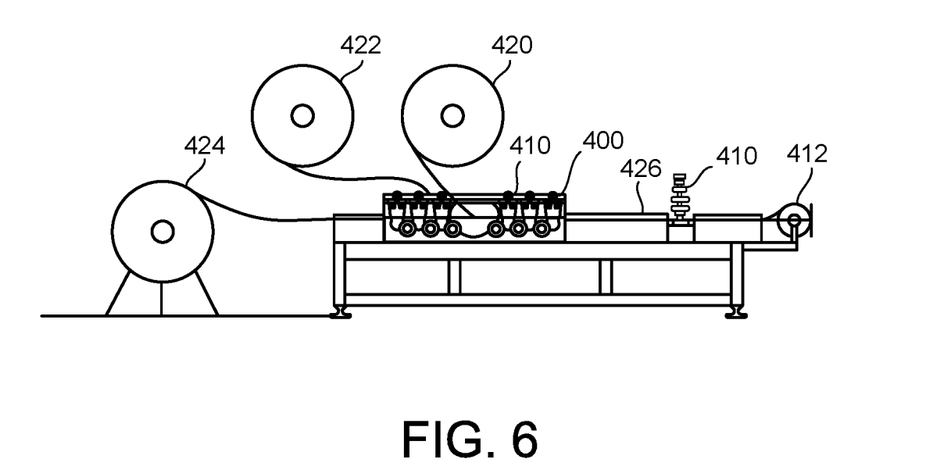
FIG. 6 is a side elevational view of the process for forming the panel assembly of the present invention.

FIGS. 5 and 6 show the process for forming the panel assembly of the present invention. Initially, there is a machine 400 that is supported upon a base 402. Rolls 404 of grid members and the barrier layer are supported upon a base 406. The separate rolls are illustrated, in particular, in FIG. 6. As the various rolls unroll, they travel together in an overlying configuration 408. As such, they will pass through the machine 400 and, in particular, through several pairs of aligned rollers 410. The aligned rollers 410 will engage with the edges of the grid members so as to bend the edges of the grid members over each other so as to sandwich the barrier layer therebetween. The layers 408 will then travel over a guide table and then to a shear 410. Shear 410 can be selectively used to cut the panel assembly. The panel assembly will further travel to a take-up roll 412 so as to accumulate the assembled panel assembly on the roller 412. A control panel 414 operates the feed mechanisms associated with the machine 400 and controls the production of the assembled panel.

FIG. 6 shows that the first grid member is received around roll 420, the barrier layer is received on roll 422 and the second grid member is received on roll 424. As the take-up roll 412 pulls on the rolls 420, 422 and 424, they are delivered into the machine 400 in a generally layered configuration. The rollers 410 will then apply pressure to this layered configuration so as to form the finished and assembled panel. In particular, this pressure is applied so as to band the outer longitudinal edges of the grid members over each other so as to sandwich the barrier layer therebetween. The assembly of the panel then travels along guide table 426 and past the shear 410. Ultimately, the panel assembly will be received by the take-up roller 412.

In the field of gardening and landscaping, the panel assembly 200 of the present invention can be utilized for landscape in raised bed edging, garden bed plant containment, garden bed root barriers, garden retaining walls, terrace garden graduated retaining walls, and green rooftop gardening. In the field of water gardening, the panel assembly 200 of the present invention can be utilized for water gardening as a butyl pond edging in the construction of natural looking streams, ponds, lakes and waterfalls when placed under the butyl liner at the water's edge. In the field of nursery uses, the panel assembly 200 of the present invention can be utilized for bulb plant cultivation in greenhouse containers keeps plant roots separated one from another when used to grow seedlings, tree seedling root ball cultivation, and nursery walkways.

In the field of construction including agriculture and farming, the panel assembly 200 of the present invention can be utilized for portable military farming construction and for vertical forming silos. In other words, suitable metallic framework can be achieve so as to create a vertical farming silo. The panel assembly 200 of the present invention can be applied to the interior surface of such a framework. As such, the panel assembly 200 can suitably retain earth or soil within the vertical farming silo while allowing water to effectively penetrate through the soil within the silo. If the barrier 300 is of a water-permeable material, then water will be able to flow therethrough. If the barrier 300 is of a water-impermeable material then the water can be retained within the farming silo.

The panel assembly 200 is also suitable for use in animal control. The panel assembly 200 can be applied in areas adjacent to a fence. Since the panel assembly 200 will extend below the fence, the present invention effectively prevents animals from digging below the fence. The present invention offers an impenetrable barrier for such wild life. As such, undesired intrusion of pets and/or other animals, is prevented. Additionally, the application of the panel assembly 200 of the present invention in areas beneath fences will avoid the loss of a pet by a pet owner.

The panel assembly 200 of the present invention can be further used in association with bridge construction. Typically, bulwarks are utilized in association with such bridge construction. As such, it is often necessary to build large earthen structures adjacent to the ends of the bridge. The panel assembly 200 of the present invention can be suitably configured so as to create the temporary-access bridge wired wall associated with such bridge construction.

The present invention is effective in use in association with erosion and sediment control. The panel assembly 200 of the present invention can be provided in the nature of a silt fence. As such, the present invention will be effective in providing soil erosion control edging. The present invention effectively prevents silt and other desirable agricultural material from eroding from the desired location. The present invention can further be utilized, in a similar manner, for beach front coast erosion prevention and control. The panel assembly 200 can be provided in areas where it is desired to retain sand on the beaches and to prevent the loss of sand from the beaches. In other circumstances, waterways will extend through a farming or agricultural area. The panel assembly of the present invention can be applied to areas adjacent to such waterways. As such, any erosion of sediment and soil into the waterway is effectively prevented. The present invention can also be applied to children's sand box constructions. Once again, the present invention effectively prevents sand from being distributed beyond the sandbox while, simultaneously, allowing water flow outwardly from the sand through the permeable barrier.

The present invention is also useful in flooding control and storm water management. The panel assembly can be applied to the banks or levies associated with a river. As such, the panel assembly will retain the levies or banks in their desired configuration. The present invention further maintains the structure of the bank or levy and will avoid the erosion of the bank or levy. When floods occur, the bank or levy will not degrade because of the forces between the water and the side of the levy or bank. In certain circumstances, the earthen constructions adjacent to rivers and streams can degrade so as to create landslides and destruction of roads extending thereupon. The application of the panel assembly of the present invention can retain such earthen structures in their desired configuration regardless of the forces that are applied by the river or stream.

The present invention is also useful for foundation improvement and stabilization. Whenever a hole is formed in the earth so as to create a foundation, the walls of the foundation will prevent destruction. The application of the panel assembly underneath the foundation and against the walls of the foundation will prevent destruction. As such, the walls of the excavation will remain intact throughout the building construction and the formation of the foundation will be stabilized.

For highways and roads, various walls are created so as to support the highways and roads. The panel of the present invention can provide a wired wall support for such earthen structures. Once again, the panel assembly 200 of the present invention will prevent any deterioration of the earthen structures during such road construction.

The present invention is further useful for landfills. The panel assembly can be provided around the periphery of the landfill so as to effectively contain the landfill. The present invention can be utilized in association with landfill vertical expansion. As such, the panel assembly can be applied in a generally horizontal orientation over the top of the landfill so as to enhance the weight capacity of the landfill.

The panel assembly of the present invention can be used in a vertical configuration or construction purposes. This vertical configuration can include panel assemblies having widths of twenty-four inches, thirty-six inches and forty-eight inches. In particular, these vertical construction uses can include underground root block barrier edging, retaining wall edging, silt fences, retaining walls, bridge retaining walls, landfill containment and vertical expansion, along with mine shaft edging. In the field of mineshaft edging, the panel assembly can be used in association with mineshaft walls, mineshaft floors, mineshaft truck dump headwalls, and mineshaft loading ramps.

The panel assembly of the present invention can further be used for horizontal construction uses. These horizontal construction uses can include underground root block barrier edging, foundation soil underlayment, road construction soil underlayment stabilization, railroad track underlayment stabilization and erosion and sediment control.

In the field of oil and gas, the panel assembly of the present invention can be applied vertically for use in association with settling reserve pits and pond construction edging. The vertical oil and gas application for the panel assembly of the present invention can be used for oil and fuel storage tank leakage containment edging. Additionally, the vertical oil and gas application of the panel assembly of the present invention can be used in refineries for underground construction edging for preventing or containment of oil and fuel leakage. Furthermore, the panel assembly of the present invention, when applied vertically in the field of oil and gas can be utilized for a service station fuel storage tank leakage containment. In each of these applications, the barrier layer should be non-permeable.

The present invention further has oil horizontal oil and gas applications. These horizontal oil and gas applications can include drill site sub-grade reinforcement edging, haul road construction edging for soil underlayment stabilization, and oilfield walkway and footpath edging for base and sub-grade stabilization.

The present invention also has a wide variety of other construction uses. In the field of agriculture and farming, the panel assembly can be used for portable military farming construction and vertical farming silos. In the field of animal control, the panel assembly prevents an animal's ability to dig under fences. In the field of said erosion and sediment control, the panel assembly provides a fence for silt, prevents beachfront coastal erosion, facilitates the restoration of beach fronts, and also provides waterway erosion control. In the field of flood control, the panel assembly of the present invention provides a water barrier, facilitates levee design and construction, and also enhances storm water management. In association with highways and roads, the panel assembly can provide wired wall supports and falling rock containment. In the field of landfills, the panel assembly provides landfill containment and vertical expansion. The present invention also finds ideal application in the field of mines. In particular, the panel assembly can be used with mineshaft retaining walls, floors and, truck dump headwalls and loading ramps. The panel assembly in the field of minds can provide high wall and long wall screens, roof and rib control, allergen and dust capture, and soft bottom flooring reinforcement. In the field of nuclear waste disposal, the present invention provides for nuclear waste disposal containment, clean water nuclear settlements, flocculant material capture in plumes of water, nuclear plumes control, and radioisotope control. In the field of railroads, the present invention provides railroad track underlayment stabilization. The panel assembly reinforces slope in the form of slope retention systems. The panel assembly can provide for retaining walls for commercial, industrial and residential projects, along with children's sandbox construction. In the field of roads, the panel assembly of the present invention can provide soil underlayment stabilization for airport runways, haul roads, parking lots, port terminals and distribution centers, reinforcement for aggregate fill material, and paved and unpaved roadway reinforcement. In the field of solid waste or sewage containment, the panel assembly of the present invention provides containment for animal fecal material runoff, effluent capture, septic tank solid waste leakage containment and root blockage, and for sewage management. In the field of water filtration and gray water treatment, the application of the panel assembly of the present invention can facilitate the availability of clean water for drinking, cooking and washing. It can also be used for gray water filtration and arsenic containment.

The panel assembly of the present invention, in the field of drilling sites, can provide for settling reserve pit/pond construction when used with non-permeable geomembrane liners, site sub-grade reinforcement, haul road construction for soil underlayment and stabilization, and oilfield walkway and footpath base and sub-grade stabilization.

The panel assembly 200 of the present invention, is strong, corrosion-resistant, and easy to handle and install in underground mines and tunnels. As such, the panel assembly 200 can be utilized for high wall screens, long wall screen, roof and rib control, and soft bottom floor reinforcement in such mines.

The panel assembly 200 of the present invention can further be applied within a mineshaft. In particular, the panel assembly can be applied to retaining walls, flooring and truck dump headwalls and loading ramps. When the panel assembly is applied, there is effective allergen and dust capture. The configuration of the present invention effectively prevents any problems associated with falling rocks. Any headwalls or loading ramps are reinforced by the structure of the present invention and maintained in their desired configuration.

The present invention can further be used in association with nuclear waste. In particular, the panel assembly 200 can be utilized for nuclear waste disposal, water nuclear sediments, flocculent material capture in plumes of water, nuclear plume control and radioisotope removal. The present invention is also useful for construction purposes. In the field of railroads, by a horizontal array of the panel assembly 200 can be provided for railroad underlayments. Whenever reinforced slopes are required during construction, the panel assembly 200 can be applied for slope tension systems. The panel assembly 200 can further be utilized as retaining wall systems for commercial, industrial and residential projects. The wire mesh associated with the grid members of the panel assembly 200 of the present invention, along with the fabric, can provide for base and sub-grade application. This can improve drainage, stabilization and strengthening. As such, it can be applied for underlayment stabilization in association with airport runways, haul roads, parking lots, port terminals and with distribution centers. The panel assembly 200 of the present invention can be a reinforcement for aggregate fill material, for paved roadways as pavement reinforcement and for use in association with unpaved roadways. As such, the present invention effectively stabilizes the soil in association with such uses.

The panel assembly is very effective as root block barrier. The present invention is effective in root block edging. The panel assembly can be applied to driveways, sidewalks and patios so as to effectively prevent roots from damaging such structures. Drainage pipes and plumbing pipe can be protected from root invasion by the application of the panel assembly of the present invention. Additionally, the panel assembly of the present invention can be applied around residential and commercial foundations so as to prevent roots from damaging the structures over time.

The panel assembly of the present invention is further effective in solid waste or sewage containment. When applied to an animal containment area, the panel assembly can prevent fecal material runoff. The panel assembly can be applied to landfill infrastructure so as to capture effluent. In those residential and commercial establishments that utilizes septic tanks, the panel assembly of the present invention can be applied therearound so as to prevent solid waste leakage and to contain any solid waste leakage that may result. Also, the present invention can prevent any root damage to such septic tanks. The panel assembly can further be applied for sewage management.

The use of the barrier in association of the panel assembly of the present invention can be adapted to a wide range of uses. In one circumstance, the barrier can be effective for water filtration. The panel assembly can be applied so as to obtain clean water for drinking, cooking and washing. The barrier can be effective in preventing release of effluents from sewage runoff. The panel assembly can be applied for grey water filtration for gardens and golf courses. In certain environments, the present invention can be applied in areas around chemical plants so as to prevent deadly chemicals from passing into the water table or underground reservoirs. As such, for a location such as China and India, the present invention can effectively prevent arsenic runoff.

The panel assembly of the present invention has a wide variety of applications in the field of oil and gas with or without the use of butyl liners. In the manner described hereinabove, the present invention can be applied to areas around drilling sites. The panel assembly can be applied to roads extending into the drilling site. The panel assembly can be applied to the drilling pad/platform, the oilfield walkway base and the sub-grade stabilization. The panel assembly is useful for multiple purposes associated with settling reserve pits or ponds for produced water and/or for flowback from hydraulic fracturing. At drilling sites, there is often a need for a large amount of proppant to be provided. The panel assembly can be utilized in association with a butyl liner so as to effectively contain the proppant in a desired location. The panel assembly of the present invention can be applied to leakage containment of the oil reservoir. Additionally, the panel assembly of the present invention facilitates drilling mud waste management, oil storage tank leakage containment, military and municipal aviation fuel leakage containment, and underground service station fuel storage tank leakage containment. If oil spills would occur the panel assembly of the present invention can be applied around such oil spill so as to effectively contain the oil spills.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A panel assembly for bracing and blocking soil comprising:
    a first panel formed of a wire grid;
    a second panel formed of a wire grid, said second panel being mechanically affixed to a side of said first panel, each of the wire grids comprising:
    a first grid member; a second grid member; and
    a barrier layer interposed between said first and second grid members;
    said first grid member and said second grid member being sealed to each other so as to sandwich said barrier layer therebetween.

2. The panel assembly of claim 1, said second panel being hingedly connected to said first panel.

3. The panel assembly of claim 1, said second panel extending from a widthwise edge or a lengthwise edge of said first panel.

4. The panel assembly of claim 1, said second panel having an identical configuration to the configuration of said first panel.

5. The panel assembly of claim 1, further comprising:
    a connector joining a side of said second panel to the side of said first panel.

6. The panel assembly of claim 5, said connector being a loop that wraps around a wire of the wire grid of said first panel and around a wire of the wire grid of said second panel.

7. The panel assembly of claim 6, said connector comprising a plurality of loops arranged in spaced relation to each other around the respective wires of said first and second panels.

8. The panel assembly of claim 1, each of said first and second grid members comprising a first plurality of wires arranged in spaced parallel relation to each other and a second plurality of wires arranged in parallel relationship to each other and extending transverse to said first plurality of wires.

9. The panel assembly of claim 1, said barrier layer being of a permeable material.

10. The panel assembly of claim 1, said barrier layer being of an impermeable material.

11. The panel assembly of claim 1, said barrier layer being of a material selected from the group consisting of polyester, polyamide, polypropylene, polyethylene, nylon and rayon.

12. The panel assembly of claim 1, each of said first and second grid members being formed of wire selected from the group consisting of metal wire, polymeric wire, polymer-coated wire, and a combination thereof.

13. The panel assembly of claim 1, each of the wire grids further comprising:
    an edge protector applied to an edge of at least one of said first and second grid members.

14. The panel assembly of claim 13, said edge protector being of a polymeric material, said edge protector affixed to a top edge of both of said first and second grid members.

15. The panel assembly of claim 13, said edge protector having an inverted U-shape, said edge protector having a first side extending over a portion of an outer side of said first grid member, a second side extending over a portion of an outer side of said second grid member, and a central area extending over the outer edges of said first and second grid members and between said first and second sides.

* * * * *